US012566454B1

(12) United States Patent
Kong et al.

(10) Patent No.: US 12,566,454 B1
(45) Date of Patent: Mar. 3, 2026

(54) INTELLIGENT MANAGEMENT METHOD AND MANAGEMENT SYSTEM OF NATURAL PASTURE USING MULTI-MACHINE COLLABORATION OF UAVS

(71) Applicant: Institute of Agricultural Economics and Development, CAAS, Beijing (CN)

(72) Inventors: Fantao Kong, Beijing (CN); Shanshan Cao, Beijing (CN); Wei Sun, Beijing (CN); Jifang Liu, Beijing (CN); Yun Han, Beijing (CN); Peigang Wei, Beijing (CN); Yi Wang, Beijing (CN); Nan Ma, Beijing (CN); Min An, Beijing (CN); Ruotong Chen, Beijing (CN); Mengdi Cao, Beijing (CN)

(73) Assignee: Institute of Agricultural Economics and Development, CAAS, Beijing (CN)

( * ) Notice: Subject to any disclaimer, the term of this patent is extended or adjusted under 35 U.S.C. 154(b) by 0 days.

(21) Appl. No.: 19/086,092

(22) Filed: Mar. 20, 2025

(51) Int. Cl.
    *G05D 1/644*     (2024.01)
    *A01K 29/00*     (2006.01)
    (Continued)

(52) U.S. Cl.
    CPC ........... *G05D 1/644* (2024.01); *A01K 29/005* (2013.01); *G05D 1/246* (2024.01); *G05D 1/69* (2024.01); *G06T 7/593* (2017.01); *G06T 7/70* (2017.01); *G06T 17/005* (2013.01); *G06T 17/05* (2013.01); *G06V 20/17* (2022.01); *G06V 20/188* (2022.01);
    (Continued)

(58) Field of Classification Search
None
See application file for complete search history.

(56) References Cited

U.S. PATENT DOCUMENTS

| | | | | |
|---|---|---|---|---|
| 2017/0308102 A1* | 10/2017 | Sane | ....................... | G01C 21/34 |
| 2023/0263135 A1* | 8/2023 | Azran | .................... | G05D 1/101 |
| | | | | 701/3 |
| 2023/0334850 A1* | 10/2023 | Harvey | ................. | G06T 17/005 |

FOREIGN PATENT DOCUMENTS

| | | |
|---|---|---|
| CN | 107544553 A | 1/2018 |
| CN | 109960272 A | 7/2019 |
| CN | 116182838 A | 5/2023 |

OTHER PUBLICATIONS

Insua et al., "Estimation of spatial and temporal variability of pasture growth and digestibility in grazing rotations coupling unmanned aerial vehicle (UAV) with crop simulation models", Plos One, Mar. 13, 2019, pp. 1-21 (Year: 2019).*

(Continued)

*Primary Examiner* — Tamara L Weber

(57) ABSTRACT

The present disclosure discloses an intelligent management method and management system of a natural pasture using multi-machine collaboration of UAVs, which belongs to the technical field of UAVs. The method includes: by a UAV group, obtaining pasture environment information, automatically planning a global grazing path, and performing automatic driving and grazing according to a user-defined grazing time, a starting point and an end point; during the process, collecting and analyzing herd activity images, and planning local grazing paths to assist in the automatic driving; and meanwhile, collecting vegetation coverage image data of a grazing area to further assist in the grazing.

4 Claims, 1 Drawing Sheet

(51) Int. Cl.

| | |
|---|---|
| *G05D 1/246* | (2024.01) |
| *G05D 1/69* | (2024.01) |
| *G06T 7/593* | (2017.01) |
| *G06T 7/70* | (2017.01) |
| *G06T 17/00* | (2006.01) |
| *G06T 17/05* | (2011.01) |
| *G06V 20/10* | (2022.01) |
| *G06V 20/17* | (2022.01) |
| *G06V 40/10* | (2022.01) |
| *G06V 40/20* | (2022.01) |
| *G05D 105/50* | (2024.01) |
| *G05D 105/80* | (2024.01) |
| *G05D 107/20* | (2024.01) |
| *G05D 109/25* | (2024.01) |
| *G05D 111/10* | (2024.01) |

(52) U.S. Cl.
CPC .............. *G06V 40/10* (2022.01); *G06V 40/20* (2022.01); *G05D 2105/50* (2024.01); *G05D 2105/80* (2024.01); *G05D 2107/21* (2024.01); *G05D 2109/25* (2024.01); *G05D 2111/10* (2024.01); *G06T 2207/10012* (2013.01); *G06T 2207/10028* (2013.01); *G06T 2207/10032* (2013.01); *G06T 2207/30188* (2013.01); *G06T 2207/30241* (2013.01)

(56) References Cited

OTHER PUBLICATIONS

Gnanasekera et al., "A Range-Based Algorithm for Autonomous Navigation of an Aerial Drone to Approach and Follow a Herd of Cattle", Sensors 2021, 21, 7218, Oct. 29, 2021, pp. 1-16 (Year: 2021).*

Pan et al., An Improved Artificial Potential Field Method for Path Planning and Formation Control of the Multi-UAV Systems, IEEE Transactions on Circuits and Systems—II: Express Briefs, vol. 69, No. 3, Mar. 2022, pp. 1129-1133 (Year: 2022).*

Alanezi et al., "Livestock Management With Unmanned Aerial Vehicles: A Review", IEEE Access, vol. 10, May 2, 2022, pp. 45001-45028 (Year: 2022).*

Yousefi et al., "A Systematic Literature Review on the Use of Deep Learning in Precision Livestock Detection and Localization Using Unmanned Aerial Vehicles", IEEE Access, vol. 10, Aug. 4, 2022, pp. 80071-80087 (Year: 2022).*

Benalaya et al., "UAV Search Path Planning For Livestock Monitoring", 2022 IEEE 11th IFIP International Conference on Performance Evaluation and Modeling in Wireless and Wired Networks (PEMWN), Nov. 8, 2022, pp. 1-6 (Year: 2022).*

Terven et al., "A Comprehensive Review of YOLO: From YOLOv1 to YOLOv8 and Beyond", ACM Computing Surveys, Apr. 4, 2023, pp. 1-27 (Year: 2023).*

Sarantinoudis et al., "Unmanned Aerial Vehicles and Livestock Management: An Application in Western Crete", 2023 International Conference on Unmanned Aircraft Systems (ICUAS), Jun. 6-9, 2023, pp. 159-166 (Year: 2023).*

Yang et al., "Research on the A-star Algorithm Based on Path Finding", 2023 IEEE 3rd International Conference on Data Science and Computer Application (ICDSCA), Oct. 27-29, 2023, pp. 199-202 (Year: 2023).*

* cited by examiner

Obtaining pasture environment information
through a UAV group

By the UAV group, automatically planning a global grazing
path according to the pasture environment information and
a user-defined grazing time, a starting point and an end point
obtained, and performing automatic driving and grazing During the process of automatic driving and
grazing based on the global grazing path,
collecting and analyzing herd activity images,
and planning local grazing paths to assist in
the automatic driving and grazing During the process of automatic driving and
grazing based on the global grazing path,
collecting and analyzing vegetation coverage
image data of a grazing area to assist in the
automatic driving and grazing

INTELLIGENT MANAGEMENT METHOD AND MANAGEMENT SYSTEM OF NATURAL PASTURE USING MULTI-MACHINE COLLABORATION OF UAVS

CROSS-REFERENCE TO RELATED APPLICATION

This application claims priority of Chinese Patent Application No. 202311494514.2, filed on Nov. 10, 2023, the entire contents of which are incorporated herein by reference.

TECHNICAL FIELD

The present disclosure relates to the technical field of UAVs, and more specifically to an intelligent management method and management system of a natural pasture using multi-machine collaboration of UAVs.

BACKGROUND

In recent years, UAVs, as a kind of convenient and low-cost low-altitude near-ground remote sensing platform, have been widely used in many fields such as land resource surveying and wildlife surveys. Compared with traditional aerial surveys, UAVs are more flexible and quieter, and can effectively avoid disturbing daily activities of a herd while maintaining a suitable supervision distance from the herd. Applying the UAVs to herd grazing in natural pastures can help achieve more real-time and efficient precise management of herds, individual identification, and the like.

But how to realize the tracking and grazing of the herds, rotate grazing areas according to vegetation coverage situations of the pasture, and obtain herd activity images through the UAVs when the herds are advancing normally or foraging to achieve individual behavior detection of the herds, so as to carry out precise grazing management is an issue that needs to be addressed.

SUMMARY

In view of this, the present disclosure provides an intelligent management method and management system of a natural pasture using multi-machine collaboration of UAVs, which meets practical needs of precise grazing management and image collection and monitoring of pasture herds.

In order to achieve the above object, the present disclosure provides the following technical solution:

An intelligent management method of a natural pasture using multi-machine collaboration of UAVs, including:

obtaining pasture environment information through a UAV group;

automatically planning, by the UAV group, a global grazing path according to the pasture environment information and a user-defined grazing time, a starting point and an end point obtained, and performing automatic driving and grazing;

during the process of automatic driving and grazing based on the global grazing path, collecting and analyzing herd activity images, and planning local grazing paths to assist in the automatic driving and grazing; and during the process of automatic driving and grazing based on the global grazing path, collecting and analyzing vegetation coverage image data of a grazing area to assist in the automatic driving and grazing.

Optionally, obtaining pasture environment information through a UAV group includes:

obtaining pasture environment image data through binocular depth cameras mounted on the UAVs;

preprocessing the pasture environment image data and performing distortion correction and stereo correction based on a stereo matching method to obtain three-dimensional dense point cloud data;

based on the three-dimensional dense point cloud data, constructing an octree map, dynamically adjusting accuracy and resolution, screening out the effective three-dimensional dense point cloud data, and constructing a pasture area environment map; and dividing the pasture area environment map into a plurality of areas that can be rotated for grazing, marking obstacles that affect normal flight of the UAV group in each area, and storing a vegetation coverage situation of each area in a cloud server to obtain the pasture environment information.

Optionally, storing a vegetation coverage situation of each area in a cloud server includes: obtaining the pasture vegetation image data through the UAV group, performing quality assessment and screening, smoothing and noise reduction, and image cropping processing on the pasture vegetation image data, calculating an area vegetation coverage degree according to the processed pasture vegetation image data and storing in the cloud server.

Optionally, automatically planning, by the UAV group, a global grazing path according to the pasture environment information and a user-defined grazing time, a starting point and an end point obtained, and performing automatic driving and grazing includes:

obtaining user-defined starting point and end point areas of grazing and a grazing time;

according to the pasture environment information and the starting point and end point areas, calling a global path planner based on an A* algorithm to plan the global grazing path, including:

selecting a Manhattan distance between two points on the path as an estimate of a distance between the two points;

obtaining terrain elevation data through sensors mounted on UAVs, establishing a digital elevation model, and adjusting a cost function of the path according to the digital elevation model: an actual cost function equation from a starting node to the node n is as follows:

$$G(n)=G(\text{parent})+\text{Cost}(n,\text{parent});$$

where: a parent node parent is a previous point to the node n, G(parent) is an actual cost from the starting point to the parent node, and Cost(n, parent) is an additional cost from the parent node to the node n;

a heuristic estimated cost function H considers a path cost from the node n to a goal node goal, and the equation is as follows:

$$H(n)=k_1\times\text{Distance}(n,\text{parent})+k_2\times|\text{Altitude}(n)-\text{Altitude}(\text{goal})|;$$

the path cost function is:

$$F(n)=G(n)+H(n)$$

where: G(n) and H(n) are actual cost and heuristic estimated cost functions. The calculated path cost function will be used to select a next node to be expanded and generate the global grazing path.

Optionally, a calculation formula of the additional cost Cost(n, parent) from the parent node to the node n is as follows:

$$\text{Cost}(n,\text{parent}) = k_1 \times \text{Distance}(n,\text{parent}) + k_2 \times |\text{Altitude}$$
$$(n) - \text{Altitude}(\text{parent})| + k_3 \times \text{Speed\_Adjusted\_Cost}$$
$$(n) + k_4 \times \text{Obstacle\_Cost}(n);$$

where: Distance(n, parent) is the Manhattan distance between the two points; Altitude(n) is the elevation of node n; Speed_Adjusted_Cost(n) is the cost related to a flight speed of the UAV, including the flight speed of the UAV and a movement speed of a herd; Obstacle_Cost(n) is the cost related to obstacles around node n, which is positively related to a density or distances of the obstacles around the path. $k_1$, $k_2$, $k_3$ and $k_4$ are weights.

Optionally, during the process of automatic driving and grazing based on the global grazing path, collecting and analyzing herd activity images, and planning local grazing paths to assist in the automatic driving and grazing includes: during the process of automatic driving and grazing based on the global grazing path, collecting and analyzing the herd activity images to obtain a position and a movement status of a herd during an actual grazing process, according to the position and movement status of the herd during the actual grazing process, calling a local path planner based on an improved artificial potential field method to plan the local paths for UAV grazing, and driving the herd to a goal grazing area through stereo players mounted on the UAVs to achieve assistance in the automatic driving and grazing.

Optionally, collecting and analyzing the herd activity images to obtain a position and a movement status of a herd during an actual grazing process includes:

collecting the herd activity image data through the UAV group;

preprocessing the collected herd activity image data, including data screening and elimination, image rotation, translation, flipping, scaling, and cropping processing to generate a data set; and based on the data set, performing model training, verification, prediction and derivation on a YOLOv8 goal detection model to achieve herd individual identification, movement trajectory monitoring and prediction, and obtain the position and movement status of the herd during the actual grazing process.

Optionally, calling a local path planner based on an improved artificial potential field method to plan the local paths for UAV grazing includes: using a Gaussian function to represent a repulsion force field, which is used to point to a direction away from the herd. The equation is as follows:

$$F_{repulsion}(x, y) = \sum_{i=1}^{N} k \cdot e^{-\alpha d_i^2} \cdot \frac{(x - x_i)}{d_i}\hat{\imath} + \frac{(y - y_i)}{d_i}\hat{\jmath};$$

where: $F_{attraction}$ is a vector of the repulsion force field; N is the number of herd individuals; k is a coefficient for adjusting repulsion force strength; $\alpha$ is a parameter for adjusting repulsion force attenuation; $d_i$ is a distance from the UAV to the $i^{th}$ herd individual; $(x_i, y_i)$ is the position of the $i^{th}$ herd individual; and (x, y) is the current position of the UAV.

Optionally, calling a local path planner based on an improved artificial potential field method to plan the local paths for UAV grazing includes: using a Gaussian function to represent an attraction force field, which is used to point to a direction of a herd individual near the UAV (when the herd individuals move, the UAV needs to follow and monitor in time). The equation is as follows:

$$F_{attraction}(x, y) = \sum_{i=1}^{N} w \cdot e^{-\beta d_i^2} \cdot \frac{(x - x_i)}{d_i}\hat{\imath} + \frac{(y - y_i)}{d_i}\hat{\jmath};$$

where: $F_{attraction}$ is a vector of the attraction force field; N is the number of herd individuals; w is a coefficient for adjusting attraction force strength; $\beta$ is a parameter for adjusting attraction force strength attenuation; $d_i$ is a distance from the UAV to the $i^{th}$ herd individual; $(x_i, y_i)$ is the position of the $i^{th}$ herd individual; and (x, y) is the current position of the UAV.

An intelligent management system of a natural pasture using multi-machine collaboration of UAVs, including: a UAV group, a readable storage medium for storing computer programs, a processor for executing the computer programs, and a cloud server, where the UAV group consists of four-rotor UAVs equipped with sensors, binocular depth cameras, stereo players and communication devices, and the computer programs, when being executed by the processor, implements the intelligent management method of the natural pasture using the multi-machine collaboration of UAVs.

As can be seen from the above technical solution, compared with the prior art, the present disclosure discloses an intelligent management method and management system of a natural pasture using multi-machine collaboration of UAVs, which can realize autonomous grazing by the UAVs without operations of herdsmen. The specific beneficial effects are:

(1) Through grazing and image collection using multi-machine collaboration of UAVs, there is no need for herdsmen to follow on-site. By inputting the user-defined grazing time, the grazing starting point and end point, the grass-livestock balance threshold, the herd image collection and other demands, an UAV system can be controlled remotely to perform real-time and precise grazing management of the herd according to actual grazing situations, which can effectively save the manpower and material resources and reduce the risk of livestock loss.

(2) The vegetation image data of the current grazing area is collected during grazing, so as to realize quantitative evaluation of grassland vegetation coverage situations. By calculating the livestock carrying capacity of the pasture, and quickly making decisions on grazing area rotation in conjunction with the environment map, the dynamic balance between grassland vegetation production and livestock grazing, and efficient and rational use of grassland resources can be realized to promote precise herd management and sustainable development of the pasture.

(3) Being automated and non-invasive, the present disclosure can realize data collection and analysis of real-time grazing and herd activity images without interfering with the normal activities of the herd, thereby realizing real-time monitoring of herd individuals and their activities under a normal grazing status, so as to find abnormal behaviors, diseases, estrus, and the like of livestock individuals in time and upload them to the system. Hence, the herdsmen can timely understand situations of the livestock individuals; moreover, through data collection and analysis of activity trajectories and feeding behaviors or the like of the livestock individuals, the present disclosure can provide a scientific basis for subsequent precise grazing management, ensure livestock health, promote animal welfare, and improve production efficiency of the pasture.

BRIEF DESCRIPTION OF DRAWINGS

In order to more clearly illustrate the embodiments of the present disclosure or the technical solutions in the prior art, the accompanying drawings required to be used in the description of the embodiments or the prior art will be briefly introduced below. Obviously, in the following description, the drawings are only embodiments of the present disclosure. For those of ordinary skill in the art, other drawings can be obtained based on the provided drawings without making creative efforts.

FIG. 1 is a schematic flow diagram of a method of the present disclosure.

DETAILED DESCRIPTION OF EMBODIMENTS

The technical solutions in the embodiments of the present disclosure will be clearly and completely described below in conjunction with the accompanying drawings in the embodiments of the present disclosure. Apparently, the described embodiments are only part of the embodiments of the present disclosure, rather than all the embodiments. Based on the embodiments of the present disclosure, all other embodiments obtained by those of ordinary skill in the art without making creative efforts fall within the scope of protection of the present disclosure.

The object of the present disclosure is to provide an intelligent management method and management system of a natural pasture using multi-machine collaboration of UAVs. The method includes: obtaining pasture environment information through a UAV group; automatically planning, by the UAV group, a global grazing path according to the pasture environment information and a user-defined grazing time, a starting point and an end point obtained, and performing automatic driving and grazing; during the process of automatic driving and grazing based on the global grazing path, collecting and analyzing herd activity images, and planning local grazing paths to assist in the automatic driving and grazing; and during the process of automatic driving and grazing based on the global grazing path, collecting and analyzing vegetation coverage image data of a grazing area to assist in the automatic driving and grazing. The present disclosure can realize autonomous grazing by the UAVs without operations of herdsmen.

In order to make the above-mentioned objects, features, and advantages of the present disclosure clearer and easier to understand, the present disclosure will be further described in detail below in conjunction with the accompanying drawings and specific implementations.

Referring to FIG. 1, an embodiment of the present disclosure discloses an intelligent management method of a natural pasture using multi-machine collaboration of UAVs, including: obtaining pasture environment information through a UAV group;

automatically planning, by the UAV group, a global grazing path according to the pasture environment information and a user-defined grazing time, a starting point and an end point obtained, and performing automatic driving and grazing;

during the process of automatic driving and grazing based on the global grazing path, collecting and analyzing herd activity images, and planning local grazing paths to assist in the automatic driving and grazing; and during the process of automatic driving and grazing based on the global grazing path, collecting and analyzing vegetation coverage image data of a grazing area to assist in the automatic driving and grazing.

In a specific embodiment, before grazing, the UAVs in the system will inspect surrounding pasture areas applicable for grazing in advance to obtain an environment map. First, the pasture environment image data is obtained through binocular depth cameras.

In a specific embodiment, the collected environment image data is preprocessed, distortion correction and stereo correction are performed based on a stereo matching algorithm, three-dimensional dense point cloud data is obtained, and an environment map is constructed.

In a specific embodiment, considering that raster maps easily cause data redundancy and increase the complexity of map data storage and calculation, based on the obtained three-dimensional dense point cloud data, an octree map is selected to be constructed. It is necessary to dynamically adjust the accuracy and resolution, store only meaningful nodes, reduce data redundancy, and reduce storage and computing complexity.

Specifically, the constructed environment map is divided into several areas that can be rotated for grazing according to the number of herds required to be grazed, and obstacles that may affect normal flight of the UAV group are marked, and the vegetation coverage situation of each area is recorded (regularly updated), where the environment map is visible to the user. The process of driving and grazing the herds by the UAVs according to the user-defined grazing time, the starting point and the end point involves environment mapping, obstacle avoidance and path planning algorithms of the UAVs. The environment mapping algorithm of the UAV uses the depth camera sensor mounted on the UAV to collect environmental data, perform feature point matching, visual odometry and other processing on continuous image frames to achieve three-dimensional reconstruction of the environment and generate the environment map. Because there are a plurality of UAVs, communication and data sharing between the plurality of UAVs can be used coordinatively to jointly complete environment mapping tasks in large-scale grazing areas. The obstacle avoidance algorithm detects and avoids obstacles based on sensor data and environment information, ensuring a safe distance between the UAV and the herd, and avoiding collisions between the UAVs and interference to normal activities of the herd. The path planning algorithm refers to planning the path during the process of driving and tracking the herd by the UAVs, image collection, and the like. It needs to consider the position and movement status of the herd, as well as relative positions and obstacle avoidance requirements between the UAVs, and generate a suitable path so as to achieve effective monitoring and image collection of the herd.

In a specific embodiment, during grazing, the user can define the starting point and end point areas and the grazing time of grazing based on the environment map uploaded by the UAV system, and the UAV system will call a global path planner based on an A* algorithm to plan the global path according to the user-defined starting point and end point areas. Then according to the position and movement status of the herd during the actual grazing process, the local path planner based on an improved artificial potential field method is called to plan local paths for UAV grazing, and the herd is driven to a goal grazing area through stereo players. If the herds are too dispersive, the UAV will also gather them together.

In a specific embodiment, herd grazing usually adopts open areas such as grasslands and pastures with abundant grass coverage, preferably without apparent obstacles or restrictions. The terrain is relatively flat without excessive terrain undulations or steep slopes, which allow the herd to move freely. Therefore, the UAV system needs to take into account factors such as large obstacles and terrain undulations or other factors when constructing the environment map and performing path planning, and obtain terrain elevation data through sensors, such as digital elevation models (DEM), and integrate it into the UAV path planning.

Specifically, in the A* global path planning algorithm, considering that in the actual grazing process, it is necessary to consider the path length, terrain fluctuations and UAV flight speed control at the same time, the present disclosure has improved a path cost function of the A* algorithm: first, considering the length of a planned path, in order to save the calculation time, a Manhattan distance between two points is selected as an estimate of the distance between the two points; second, a cost function of the path is further adjusted based on collected elevation information to avoid selecting a global grazing path with apparent obstacles or too steep and high terrain; finally, considering regulation of a flight speed of the UAV, the UAV can fly quickly when there are no obstacles nearby and the herd is advancing fast, and can fly slowly when encountering obstacles or the herd is moving slowly.

An actual cost function formula from a starting node to the node n is as follows:

$$G(n)=G(\text{parent})+\text{Cost}(n,\text{parent})$$

where: a parent node parent is a previous point to the node n, G(parent) is an actual cost from the starting point to the parent node, and Cost(n, parent) is an additional cost from the parent node to the node n. The equation is as follows:

$$\text{Cost}(n,\text{parent})=k_1\times\text{Distance}(n,\text{parent})+k_2\times|\text{Altitude}$$
$$(n)-\text{Altitude}(\text{parent})|+k_3\times\text{Speed\_Adjusted\_Cost}$$
$$(n)+k_4\times\text{Obstacle\_Cost}(n)$$

where: Distance(n, parent) is the Manhattan distance between the two points; Altitude(n) is the elevation of the node n; Speed_Adjusted_Cost(n) is the cost related to a flight speed of the UAV, including the flight speed of the UAV and a movement speed of a herd; Obstacle_Cost(n) is the cost related to obstacles around node n, which is positively related to a density or distances of the obstacles around the path. $k_1$, $k_2$, $k_3$ and $k_4$ are weights of corresponding items. The weights can be adjusted according to actual task requirements to weigh priorities of global path planning in path length, terrain fluctuations, flight speed control and surrounding obstacles. The larger the k value is, the more significant the impact of this factor on the path cost is.

A heuristic estimated cost function H considers a path cost from the node n to a goal node goal, and the equation is as follows:

$$H(n)=k_1\times\text{Distance}(n,\text{parent})+k_2\times|\text{Altitude}(n)-\text{Altitude}$$
$$(\text{goal})|;$$

the path cost function is:

$$F(n)=G(n)+H(n)$$

where G(n) and H(n) are actual cost and heuristic estimated cost functions defined above. The A* algorithm will use this path cost function to select a next node to be expanded and generate the path.

In a specific embodiment, the artificial potential field method of local path planning is to drive the UAV to avoid obstacles and approach the goal by introducing a potential field in the environment. However, the traditional artificial potential field method has problems in actual grazing scenarios. There may be some problems, such as unreachable goals, falling into local optimality, shock, etc. In order to solve the above problems and further improve the effect of local path planning of UAVs, the artificial potential field method of local path planning in this embodiment is improved on the basis of a traditional artificial potential field method, specifically in the following aspects: the first improvement is to combine the artificial potential field method with the global path planning method, provide overall path guidance through global path planning, and then use the artificial potential field method for local obstacle avoidance to overcome limitations of the artificial potential field method; the second improvement is to dynamically adjust the shape and intensity of a potential field according to the position and movement status of the herd, and design appropriate potential field strategies based on the behavioral characteristics of the herd, such as introducing attraction and repulsion forces to simulate gathering and dispersion behaviors of the herd so as to better adapt to actual grazing scenarios; the third improvement is to avoid the UAV falling into local optimality and improve robustness of path planning by introducing random disturbances, path re-planning, and the like; the fourth improvement is to choose appropriate sensors, such as lidar, binocular depth cameras, and the like, to sense changes in the herd and environment in real time, and dynamically update path planning; the fifth improvement is to consider dynamics and constraints of the UAV, such as maximum speed, maximum acceleration, and the like, to ensure the feasibility and safety of path planning.

Specifically, the artificial potential field method is a path planning method based on a virtual potential field, which guides moving objects by introducing attraction and repulsion force fields in the environment to achieve the goal of planning a path. In the process of local path planning for UAV grazing, the corresponding potential field strategy is designed taking into account behavioral characteristics of the herds.

Behavioral characteristics of the herds typically include: first, herd aggregation, where the herds tend to move closer to each other and form groups; second, obstacle avoidance of the herd, where the herd will actively avoid obstacles when advancing. Based on the above behavioral characteristics, in order to prevent the UAV from getting too close to the herd during flight and affecting the normal activities of the herd, a repulsion force field strategy is designed. The size and direction of a repulsion force field should be related to the distance and relative speed between the UAV and the herd. A Gaussian function is used to represent the repulsion force field. The equation is as follows:

$$F_{repulsion}(x, y) = \sum_{i=1}^{N} k \cdot e^{-\alpha d_i^2} \frac{(x - x_i)}{d_i}\hat{i} + \frac{(y - y_i)}{d_i}\hat{j}$$

where: $F_{repulsion}$ is a vector of the repulsion force field; N is the number of herd individuals; k is a coefficient for adjusting repulsion force strength; $\alpha$ is a parameter for adjusting repulsion force attenuation; $d_i$ is a distance from the UAV to the $i^{th}$ herd individual; $(x_i, y_i)$ is the position of the $i^{th}$ herd individual; and $(x, y)$ is the current position of the UAV. This repulsion force field will generate a vector that points to a direction away from the herd and increases as the distance between the UAV and the herd decreases. The specific repulsion force parameters can be adjusted based on grazing experience and task requirements to better achieve the grazing task. The UAV will be affected by the repulsion force field during flight to ensure that it maintains a sufficient distance from the herd and avoid affecting normal activities of the herd.

In addition, when the herd moves, the UAV needs to follow and monitor in time, so an attraction force field strategy is designed to guide the UAV to follow the moving direction of the herd. The size and direction of an attraction force field are also affected by the distance and relative speed between the UAV and the herd individual. A Gaussian function is used to represent the attraction force field. The equation is as follows:

$$F_{attraction}(x, y) = \sum_{i=1}^{N} w \cdot e^{-\beta d_i^2} \frac{(x - x_i)}{d_i} \hat{\imath} + \frac{(y - y_i)}{d_i} \hat{\jmath}$$

where: $F_{attraction}$ is a vector of the attraction force field; N is the number of herd individuals; w is a coefficient for adjusting attraction force strength; $\beta$ is a parameter for adjusting attraction force strength attenuation; $d_i$ is a distance from the UAV to the $i^{th}$ herd individual; $(x_i, y_i)$ is the position of the $i^{th}$ herd individual; and (x, y) is the current position of the UAV. This attraction force field will generate a vector that points to the herd individual closest to the UAV. The strength of the attraction force field will increase as the distance of the UAV from the herd decreases, so that the UAV will move in the direction of the herd movement. The specific attraction force parameter can be adjusted based on grazing experience and task requirements to better achieve the grazing task.

With comprehensive consideration of the repulsion force field and the attraction force field, the potential field parameters are adjusted through test flight experiments to adapt to different herd behavioral characteristics and grazing requirements, and realize the path planning of the UAV grazing system in safely driving and guiding the herd.

Specifically, after realizing the improvement of the path planning algorithm, the specific steps for obtaining the grazing path through the above-mentioned path planning algorithm are as follows: first, the user-defined starting point and end point position coordinates, as well as the environment map and obstacle information obtained by the UAV inspection before grazing, are used as inputs to the path planning algorithm; second, the global optimal path from the starting point to the end point is searched based on the improved A* path planning algorithm and the pasture area environment map; third, the environment map is updated in real time during the actual flight process of the UAV, and the local path under the current situation is planned based on the improved artificial potential field method; and fourth, the UAV executes the path.

In a specific embodiment, when the herd is in a relatively stable advancing or foraging status, the system dispatches 3 UAVs to monitor the status of the herds around to ensure that all the herds are foraging in a monitoring area, dispatches 1-2 UAVs to fly above the herds, collects the herd activity image data and the vegetation coverage image data from a hovering perspective and uploads them to the server.

In a specific embodiment, if a livestock individual leaves the monitoring range, 1 UAV is sent from the monitoring UAV group to track the individual. At this time, the UAV needs to quickly track the livestock individual that has left the herd and use stereo players to drive it back into monitorable herd activity range.

In a specific embodiment, while the UAV system is conducting collaborative grazing, it will also conduct data collection of herd activity images and vegetation coverage images in the grazing area to assist in automatic driving and grazing. Therefore, a multi-machine collaborative algorithm is required to achieve collaborative work of UAVs.

First, a coordinated cluster of a plurality of UAVs in the system is formed in order to realize a UAV cluster formation algorithm based on the virtual structure algorithm that drives the herds to designated grazing locations. The relative position and speed of the UAVs are adjusted to adjust the flight trajectory of the UAVs to coordinately drive and monitor the herds with a set geometric shape or dynamic structure.

Second, based on communication and collaboration algorithms of the UAV system, information exchange and data sharing between UAVs are carried out to collaboratively complete the grazing and data collection tasks.

Subsequently, when the herd is in a relatively stable advancing or foraging status, the system will dynamically allocate appropriate positions and tasks to each UAV based on the task allocation algorithm, and collaboratively complete monitoring of grazing, herd status image data collection and environment image data collection tasks in grazing areas to achieve comprehensive supervision of the herd and real-time monitoring of the grazing environment.

In a specific embodiment, a data collection and analysis module of the vegetation coverage situation in the grazing area of the UAV system mainly includes functions such as data collection, vegetation coverage situation analysis, and grass-livestock balance management.

Specifically, the grass-livestock balance management is an important detection indicator for precise grazing management. Before grazing, the UAVs in the system will inspect the surrounding pasture areas for grazing in advance, obtain vegetation image data, and upload it to the system server.

First, the collected image data will be preprocessed by quality assessment screening, smoothing and noise reduction, image cropping, and the like, and then the area vegetation coverage degree will be calculated based on the processed image data; the pasture is divided into several areas that can be rotated for grazing according to the number of herds required to be grazed, and the vegetation coverage degree of each area is recorded (updated regularly).

During the grazing process, when the herd is in a relatively stable foraging status, the system will dispatch 1-2 UAVs to fly above the herd based on a multi-machine collaborative algorithm, photograph the pasture area vegetation image data by hovering and looking down, and upload it to the system server. The system will perform data preprocessing and calculate the vegetation coverage degree of the current grazing area.

In addition, the system will also estimate the herd foraging demand based on the actual number of grazing livestock, and then calculate the grass-livestock balance based on the area vegetation coverage degree, and then make a decision on whether the current grazing area needs to be changed: if the vegetation coverage situation in the current area is less than a grass-livestock balance threshold set by the system, the herd will be driven to an area in the pasture with a better vegetation coverage situation; if the current grazing area has not reached the grass-livestock balance threshold, there is no need to drive the herd to rotate the grazing area.

In a specific embodiment, the data collection and analysis module of the herd activity images of the UAV system mainly includes functions such as data collection, herd individual identification, goal detection, and the like, to assist in automatic driving and grazing.

When the herd is in a relatively stable advancing or foraging status, the system dispatches 1-2 UAVs to fly above the herd based on the multi-machine collaborative algorithm, and adjusts the flight height and flight speed according to weather conditions and the approximate activity speed of the herd. By hovering and looking down, the system photographs the herd activity image data vertically and equidistantly and uploads the data to the system server.

The server will preprocess the collected image data, including data screening and elimination, image rotation, translation, flipping, scaling, cropping, etc. to achieve data enhancement, and then divide the data set into a training set and a test set.

Subsequently, based on the data set and historical image data, model training, verification, prediction and derivation are performed on a YOLOv8 goal detection model to achieve herd individual identification, movement trajectory monitoring and prediction.

The YOLOv8 goal detection model introduces a new improved module, which greatly improves the speed and performance. However, in the practical application of the UAV system for herd individual identification, there are inevitable problems such as UAV flight jitter, poor consistency in data set photographing height and imbalance in the number of samples of different categories, which have an impact on the training and performance of the model. In order to overcome the above problems and further improve detection accuracy, some improvements are made to the data collection and analysis process of the UAV system: first, in the data set collection stage, according to the types of grazing herds, as much and richer individual characteristics data of livestock as possible is collected, including images of different breeds, different ages, and different lighting conditions, to increase the generalization ability of the model; second, in the data preprocessing stage, data enhancement is achieved through data screening and elimination, image rotation, translation, flipping, scaling, cropping, and the like, to improve the model ability to identify individual goals; third, multi-scale training and inference are conducted, where during the model training and inference process, the UAVS can be used to fly at different heights or angles to obtain image data of different scales to improve the model ability to identify goals of different scales; fourth, the learning rate, regularization parameters and other hyperparameters of the model are adjusted according to the model training situation to find a model configuration more suitable for the current livestock type; fifth, in order to solve the problem of imbalance in sample data of different categories, methods such as oversampling, undersampling or category weighting are adopted to balance the categories to avoid the model from neglecting smaller categories; and sixth, transfer learning is conducted based on pre-trained model weights, the weights of the model trained on relevant tasks on large-scale historical data are used as the initial weights, the weights of some network layers are frozen, new output layers are replaced or added according to the needs of an actual goal detection task, some network layers are unfrozen and allowed to fine-tune parameters on new tasks, and newly collected data sets are used to train and optimize the model to improve model training and improve model performance.

On the other hand, embodiments of the present disclosure disclose an intelligent management system of a natural pasture using multi-machine collaboration of UAVs. The system consists of 3-5 four-rotor UAVs equipped with sensors, cameras, stereo players and communication devices, a readable storage medium for storing computer program instructions, and a processor for executing the computer programs, which is used for multi-machine collaborative grazing and image collection functions. The system can complete the image information collection of herd activities and grassland in the grazing areas without interfering with the normal activities of the herd, and can play sounds according to the needs of grazing management to drive the herd towards the goal location. Under different circumstances, the UAVs in the system will undertake different tasks such as grazing or image collection, so corresponding path planning and multi-machine collaborative control algorithms are required. The pasture vegetation coverage data collected by this system can be used to analyze grazing intensity in real time. The UAV system can be used to drive the herds from areas with higher grazing intensity to those with lower grazing intensity so as to maintain the grass-livestock balance and avoid overgrazing that damages ecological functions of the grassland. The herd activity image data collected by this system can be used to analyze the herd activity trajectory and identify individual behaviors for precise grazing management.

Optionally, embodiments of the present disclosure provide an intelligent management system of a natural pasture using multi-machine collaboration of UAVs, including: a UAV group, a readable storage medium for storing computer programs, a processor for executing the computer programs, and a cloud server, where the UAV group consists of four-rotor UAVs equipped with sensors, binocular depth cameras, stereo players and communication devices, and the computer programs, when being executed by the processor, implements the step of by a UAV group, obtaining pasture environment information in the intelligent management method of the natural pasture using the multi-machine collaboration of UAVs.

As for the system device disclosed in the embodiment, since it corresponds to the method disclosed in the embodiment, the description is relatively simple. For relevant details, please refer to the description of the method part.

Each embodiment in this specification is described in a progressive manner. Each embodiment focuses on the differences from other embodiments. The same and similar parts between the various embodiments can be referred to each other. As for the device disclosed in the embodiment, since it corresponds to the method disclosed in the embodiment, the description is relatively simple. For relevant details, please refer to the description in the method section.

The above description of the disclosed embodiments enables those skilled in the art to implement or use the present disclosure. Various modifications to these embodiments will be readily apparent to those skilled in the art, and the generic principles defined herein may be practiced in other embodiments without departing from the spirit or scope of the invention. Thus, the present disclosure is not intended to be limited to the embodiments shown herein but is to be accorded the widest scope consistent with the principles and novel features disclosed herein.

The invention claimed is:

1. An intelligent management method of a natural pasture using multi-machine collaboration of UAVs, comprising:

obtaining pasture environment information through a UAV group;

automatically planning, by the UAV group, a global grazing path according to the pasture environment information and a user-defined grazing time, a starting point and an end point obtained, and performing automatic driving and grazing;

during the process of automatic driving and grazing based on the global grazing path, collecting and analyzing herd activity images, and planning local grazing paths to assist in the automatic driving and grazing;

during the process of automatic driving and grazing based on the global grazing path, collecting and analyzing vegetation coverage image data of a grazing area to assist in the automatic driving and grazing;

wherein, automatically planning, by the UAV group, a global grazing path according to the pasture environment information and a user-defined grazing time, a starting point and an end point obtained, and performing automatic driving and grazing comprises:

obtaining user-defined starting point and end point areas of grazing and a grazing time;

according to the pasture environment information and the starting point and end point areas, calling a global path planner based on an A* algorithm to plan the global grazing path, comprising:

selecting a Manhattan distance between two points on the path as an estimate of a distance between the two points;

obtaining terrain elevation data through sensors mounted on UAVs, establishing a digital elevation model, and adjusting a cost function of the path according to the digital elevation model:

an actual cost function formula from a starting node to the node n is as follows:

$$G(n)=G(\text{parent})+\text{Cost}(n,\text{parent});$$

wherein: a parent node parent is a previous point to the node n, G(parent) is an actual cost from the starting point to the parent node, and Cost(n, parent) is an additional cost from the parent node to the node n;

a heuristic estimated cost function H considers the path cost from the node n to a goal node goal, and the equation is as follows:

$$H(n)=k_1\times\text{Distance}(n,\text{parent})+k_2\times|\text{Altitude}(n)-\text{Altitude}(\text{goal})|;$$

the path cost function is:

$$F(n)=G(n)+H(n)$$

wherein: G(n) and H(n) are actual cost and heuristic estimated cost functions; the calculated path cost function will be used to select a next node to be expanded and generate the global grazing path;

a calculation formula of the additional cost Cost(n, parent) from the parent node to the node n is as follows:

$$\text{Cost}(n,\text{parent})=k_1\times\text{Distance}(n,\text{parent})+k_2\times|\text{Altitude}(n)-\text{Altitude}(\text{parent})|+k_3\times\text{Speed\_Adjusted\_Cost}(n)+k_4\times\text{Obstacle\_Cost}(n);$$

wherein: Distance(n, parent) is the Manhattan distance between the two points; Altitude(n) is the elevation of node n; Speed_Adjusted_Cost(n) is the cost related to a flight speed of the UAV, comprising the flight speed of the UAV and a movement speed of a herd; Obstacle_Cost(n) is the cost related to obstacles around the node n, which is positively related to a density or distances of the obstacles around the path; and $k_1$, $k_2$, $k_3$ and $k_4$ are weights;

wherein obtaining pasture environment information through a UAV group comprises:

obtaining pasture environment image data through binocular depth cameras mounted on the UAVs;

preprocessing the pasture environment image data and performing distortion correction and stereo correction based on a stereo matching method to obtain three-dimensional dense point cloud data;

based on the three-dimensional dense point cloud data, constructing an octree map, dynamically adjusting accuracy and resolution, screening out the effective three-dimensional dense point cloud data, and constructing a pasture area environment map; and dividing the pasture area environment map into a plurality of areas that can be rotated for grazing, marking obstacles that affect normal flight of the UAV group in each area, and storing a vegetation coverage situation of each area in a cloud server to obtain the pasture environment information;

wherein storing a vegetation coverage situation of each area in a cloud server comprises: obtaining the pasture vegetation image data through the UAV group, performing quality assessment and screening, smoothing and noise reduction, and image cropping processing on the pasture vegetation image data, calculating an area vegetation coverage degree according to the processed pasture vegetation image data and storing in the cloud server;

wherein during the process of automatic driving and grazing based on the global grazing path, collecting and analyzing herd activity images, and planning local grazing paths to assist in the automatic driving and grazing comprises: during the process of automatic driving and grazing based on the global grazing path, collecting and analyzing the herd activity images to obtain a position and a movement status of a herd during an actual grazing process, according to the position and movement status of the herd during the actual grazing process, calling a local path planner based on an improved artificial potential field method to plan the local paths for UAV grazing, and driving the herd to a goal grazing area through stereo players mounted on the UAVs to achieve assistance in the automatic driving and grazing;

wherein calling a local path planner based on an improved artificial potential field method to plan the local paths for UAV grazing comprises: using a Gaussian function to represent a repulsion force field, which is used to point to a direction away from the herd; the equation is as follows:

where: $F_{repulsion}$ is a vector of the repulsion force field; N is the number of herd individuals; k is a coefficient for adjusting repulsion force strength; $\alpha$ is a parameter for adjusting repulsion force attenuation; $d_i$ is a distance from the UAV to the $i^{th}$ herd individual; $(x_i, y_i)$ is the position of the $i^{th}$ herd individual; and (x, y) is the current position of the UAV;

wherein calling a local path planner based on an improved artificial potential field method to plan the local paths for UAV grazing comprises: using a Gaussian function to represent an attraction force field, which is used to point to the herd individual closest to the UAV; the equation is as follows:

where: $F_{attraction}$ is a vector of the attraction force field; N is the number of herd individuals; w is a coefficient for adjusting attraction force strength; β is a parameter for adjusting attraction force strength attenuation; $d_i$ is a distance from the UAV to the $i^{th}$ herd individual; $(x_i, y_i)$ is the position of the $i^{th}$ herd individual; and (x, y) is the current position of the UAV;

the improved artificial potential field method is achieved by:

combining a traditional artificial potential field method with the global path planning method, providing overall path guidance through global path planning, and using the artificial potential field method for local obstacle avoidance to overcome limitations of the artificial potential field method;

dynamically adjusting a shape and intensity of a potential field according to the position and movement status of the herd, and designing a potential field strategies based on the behavioral characteristics of the herd to adapt to actual grazing scenarios;

avoiding the UAV falling into local optimality and improving robustness of path planning by introducing random disturbances, and path re-planning;

choosing sensors to sense changes in the herd and environment in real time to dynamically update path planning; and considering dynamics and constraints of the UAV to ensure feasibility and safety of path planning;

the calling a local path planner based on an improved artificial potential field method to plan the local paths for UAV grazing, comprises:

using the user-defined starting point and end point position coordinates, as well as the pasture area environment map and obstacle information obtained by the UAV inspection before grazing as inputs to the path planning algorithm;

searching a global optimal path from the starting point to the end point based on an improved A* path planning algorithm and the pasture area environment map;

updating the pasture area environment map in real time during an actual flight process of the UAV, and planning the local path under a current situation based on the improved artificial potential field method; and planning the local paths by the UAV.

2. The intelligent management method of the natural pasture using the multi-machine collaboration of UAVs according to claim 1, wherein collecting and analyzing the herd activity images to obtain a position and a movement status of a herd during an actual grazing process comprises:

collecting the herd activity image data through the UAV group;

preprocessing the collected herd activity image data, including data screening and elimination, image rotation, translation, flipping, scaling, and cropping processing to generate a data set; and based on the data set, performing model training, verification, prediction and derivation on a YOLOv8 goal detection model to achieve herd individual identification, movement trajectory monitoring and prediction, and obtain the position and movement status of the herd during the actual grazing process.

3. An intelligent management system of a natural pasture using multi-machine collaboration of UAVs, comprising: a UAV group, a readable storage medium for storing computer programs, a processor for executing the computer programs, and a cloud server, wherein the UAV group consists of four-rotor UAVs equipped with sensors, binocular depth cameras, stereo players and communication devices, and the computer programs, when being executed by the processor, implements the intelligent management method of the natural pasture using the multi-machine collaboration of UAVs according to claim 1.

4. An intelligent management system of a natural pasture using multi-machine collaboration of UAVs, comprising: a UAV group, a readable storage medium for storing computer programs, a processor for executing the computer programs, and a cloud server, wherein the UAV group consists of four-rotor UAVs equipped with sensors, binocular depth cameras, stereo players and communication devices, and the computer programs, when being executed by the processor, implements the intelligent management method of the natural pasture using the multi-machine collaboration of UAVs according to claim 2.

* * * * *